United States Patent [19]

Rooke et al.

[11] Patent Number: 4,488,464

[45] Date of Patent: Dec. 18, 1984

[54] DEVICE FOR CUTTING CONTINUOUS LOGS OF DOUGH

[75] Inventors: Robert J. Rooke, Duncanville; James E. Skierski, Carrollton; Raymond V. Brockie, Dallas, all of Tex.

[73] Assignee: Frito-Lay, Inc., Dallas, Tex.

[21] Appl. No.: 479,465

[22] Filed: Mar. 28, 1983

[51] Int. Cl.³ ............................................. B26D 1/547
[52] U.S. Cl. ........................................ 83/99; 83/355; 83/651.1; 83/556; 83/155
[58] Field of Search .................... 83/307.1, 307.2, 350, 83/355, 556, 98, 155, 99, 315, 651.1, 308

[56] References Cited

U.S. PATENT DOCUMENTS

| 1,914,701 | 6/1933 | Morris | 83/307.2 |
| 2,263,474 | 11/1941 | Scheibl | 83/307.2 |
| 2,359,403 | 10/1944 | Burt | 83/307.2 |
| 2,802,431 | 8/1957 | Hoagland | 83/321 |
| 3,648,553 | 3/1972 | Tuschy | 83/98 |
| 3,788,181 | 1/1974 | Adair | 83/554 |
| 4,332,538 | 6/1982 | Campbell | 83/556 |

FOREIGN PATENT DOCUMENTS 1442683  6/1976  United Kingdom .

OTHER PUBLICATIONS

Werner Lehara, "Air Actuated Guillotine Knife".
Werner Lehara, "Guillotine Bar Cutter-Double Eccentric".

Primary Examiner—James M. Meister
Assistant Examiner—John L. Knoble
Attorney, Agent, or Firm—Bernard, Rothwell & Brown

[57] ABSTRACT

A cutter, such as a wire cutting element is moved in a D-shaped path which includes a substantially straight downward path to cut a slice off of the end of an advancing log of dough, such as cookie dough. The cutter returns with a curvilinear motion including a horizontally forward motion beginning at the bottom of the downward motion to disengage the cutter from the advancing log and to move the cutter sufficiently forward to ensure that the cutter does not engage the advancing end of the log during upward movement. At the end of the upward movement the cutter returns with rearward horizontal movement to the path of downward movement. The severed slice is discharged with the aid of air jets from the end of a conveyor where it drops onto a second conveyor for advancement to subsequent processing stations such as an oven.

10 Claims, 15 Drawing Figures

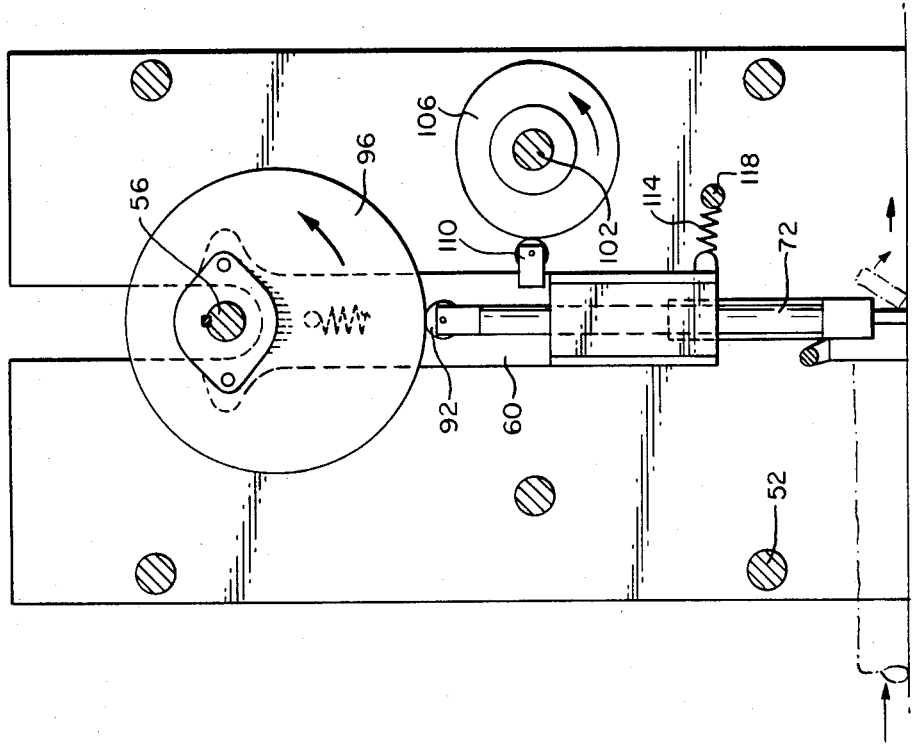
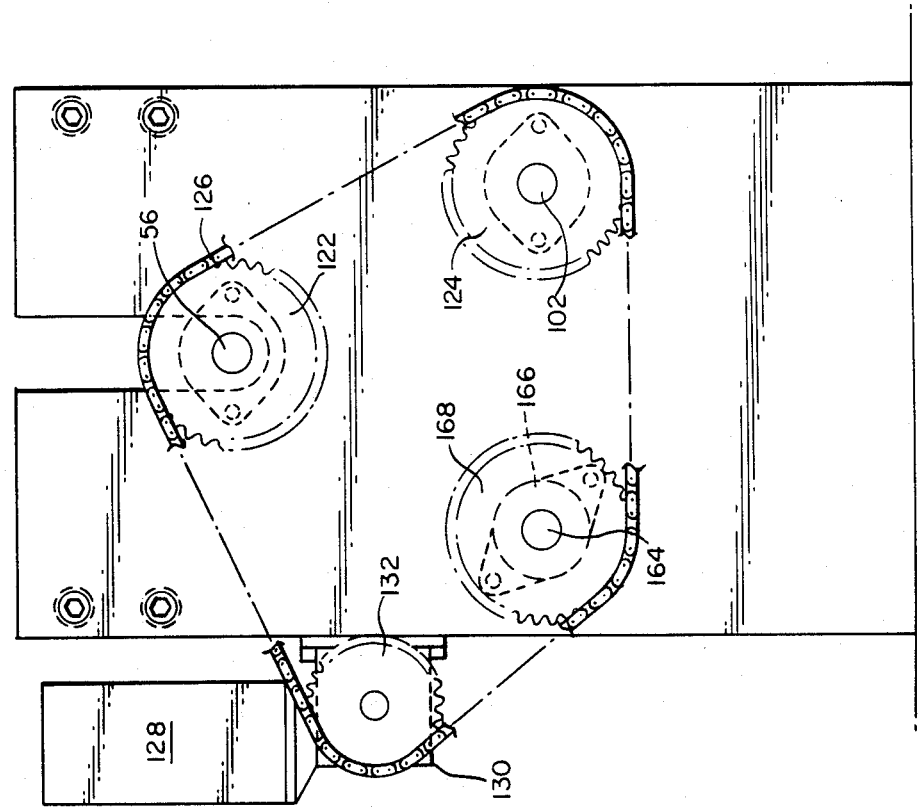

DEVICE FOR CUTTING CONTINUOUS LOGS OF DOUGH

BACKGROUND OF THE INVENTION

1. Field of the Invention

The present invention relates to devices for cutting continuously advancing strands or logs of soft pliable material including cookie dough, sausage, bananas, gelatinous materials, putty, clay, or other continuous strand material made from soft pliable material.

2. Description of the Prior Art

The prior art contains a number of devices and apparatus for cutting continuous strands of dough such as cookie dough which are subsequently baked into finished cookies. One such type of prior art cutting device is known as a guillotine cutter and uses a vertically reciprocating knife blade for cutting the strands of pastry dough passing beneath the cutter on a conveyor belt; such reciprocating knife blades tend to frictionally rub on the advancing end of the log resulting in squashing or distorting of the end of the advancing log producing slices which are substantially out of round. Another type of cutter known as guillotine bar cutter is used for cutting continuous strands of flat unbaked products, such as food bars, into individual pieces prior to baking; a heavy knife bar is mechanically driven to pinch the strand into pieces and momentarily follows the conveyor belt travel with a rocking motion while in the extended position to minimize product damage. A further device known as a wire cut machine is used for cutting cookie dough into individual pieces and depositing them on an oven band for baking; the cookie dough being continuously extruded through orifices and the wire cutter passing over the orifices to sever slices from the extruding dough. The wire contacts the die surface on the cutting stroke and indexes away from the die before returning to the start position.

SUMMARY OF THE INVENTION

The invention is summarized in a cutting apparatus or device employing a cutting element which is moved in a generally D-shaped path. This D-shaped path includes a substantially straight downward portion of movement for cutting a slice from an advancing dough log or strand and a return portion of movement beginning in a substantially forward horizontal movement at the end of the downward movement and ending in rearward movement to return to the path of the downward movement. The return motion is selected in conjunction with the speed of the conveyor advancing the log for bringing about disengagement of the cutting element from the end of the log and maintaining separation of the cutting element from the advancing edge of the log to avoid distorting the cross-section of the log end.

An object of the invention is to construct a cutting apparatus suitable for cutting slices from a log of relatively soft pliable matter at a substantially increased speed without distorting the cross-sectional shape of the log and slices.

One advantage of the invention is that a D-shaped motion produces disengagement of a cutting element from an advancing strand and maintains disengagement during a portion of upward movement to prevent engagement and distortion of the advancing end of the log.

One feature of the invention is that cut slices are discharged from the first conveyor to a second conveyor with the aid of air jets to avoid engagement of the cutting element with the slices being deposited on the second conveyor.

Other objects, advantages and features of the invention will be apparent from the following description of the preferred embodiment taken in conjunction with the accompanying drawings.

BRIEF DESCRIPTION OF THE DRAWINGS

FIG. 4 is a left side elevation view of the apparatus of FIGS. 1 and 2.

FIG. 5 is a side cross-sectional view taken at line 5—5 in FIG. 3.

DESCRIPTION OF THE PREFERRED EMBODIMENT

Figure 1:
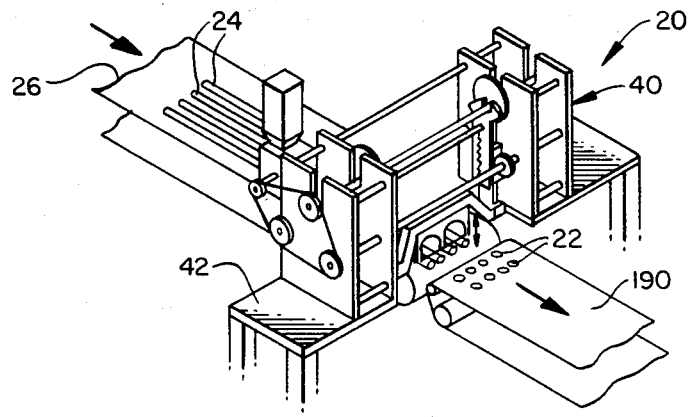
FIG. 1 is a perspective view of a cutting apparatus for severing slices from the ends of advancing logs or strands of cookie dough in accordance with the invention.
Figure 10:
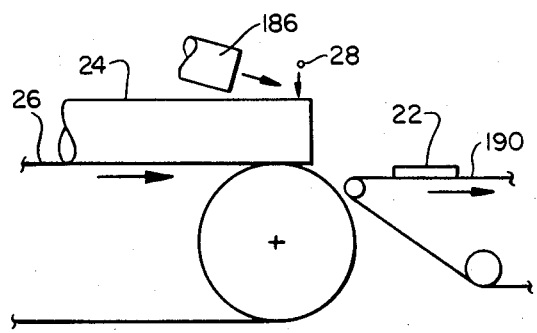
FIG. 10 is a diagramatical sketch illustrating one point in the cutting process of the apparatus of FIGS. 1 and 2.
Figure 11:
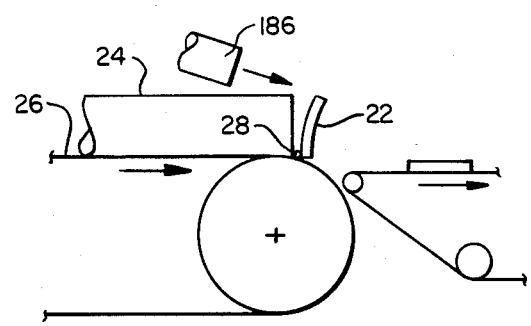
FIG. 11 is a diagramatical sketch similar to FIG. 10 but illustrating a second position of the cutting apparatus.
Figure 12:
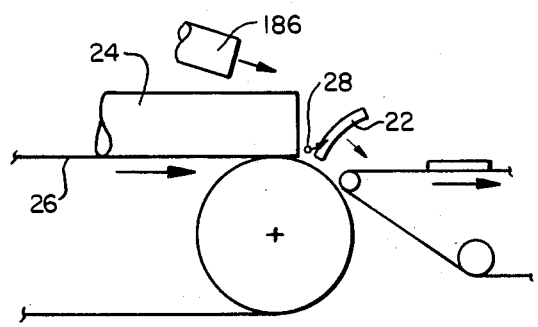
FIG. 12 is a diagramatical sketch similar to FIGS. 10 and 11 but illustrating a third position of the cutting apparatus.
Figure 13:
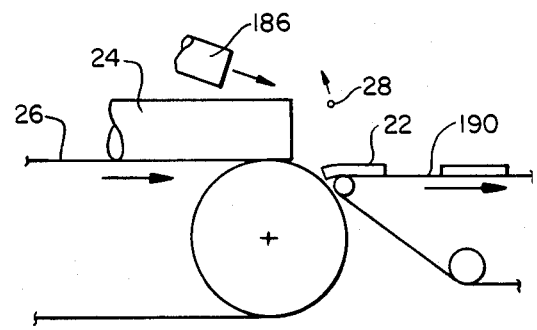
FIG. 13 is a diagramatical sketch similar to FIGS. 10-12 but illustrating a fourth position of the cutting element of the apparatus.
Figure 14:
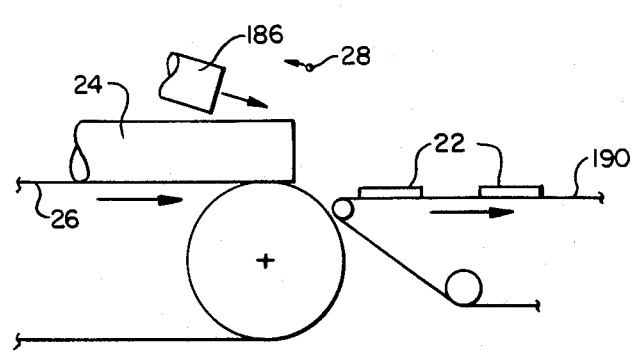
FIG. 14 is a diagramatical sketch similar to FIGS. 10-13 but illustrating a fifth position of the cutting element of the apparatus.

As illustrated in FIG. 1, one embodiment of the invention includes a cutting device or apparatus indicated generally at 20 for cutting slices 22 from one or more logs or strands of cookie dough 24 which are continuously advanced by a conveyor 26. The cutting device 20 includes a wire cutting element 28, FIG. 2, which is moved in a generally D-shaped path as illustrated generally at 30 in FIG. 15. This movement includes a generally straight downward portion of movement 32 which as shown in FIGS. 10 and 11 is used to sever slices from the dough logs 24, and a return portion of movement 34 having an initial generally forward horizontal portion of movement 36 designed to disengage the cutting element 28 from the advancing end of the dough log 24 as shown in FIG. 12. The return path 34 moves the cutting element 28 upward past the end of the dough log 24 while maintaining spacing therefrom after which rearward movement of the cutting element 28 returns the element 28 to the downward cutting path as illustrated in FIGS. 13 and 14.

Figure 3:
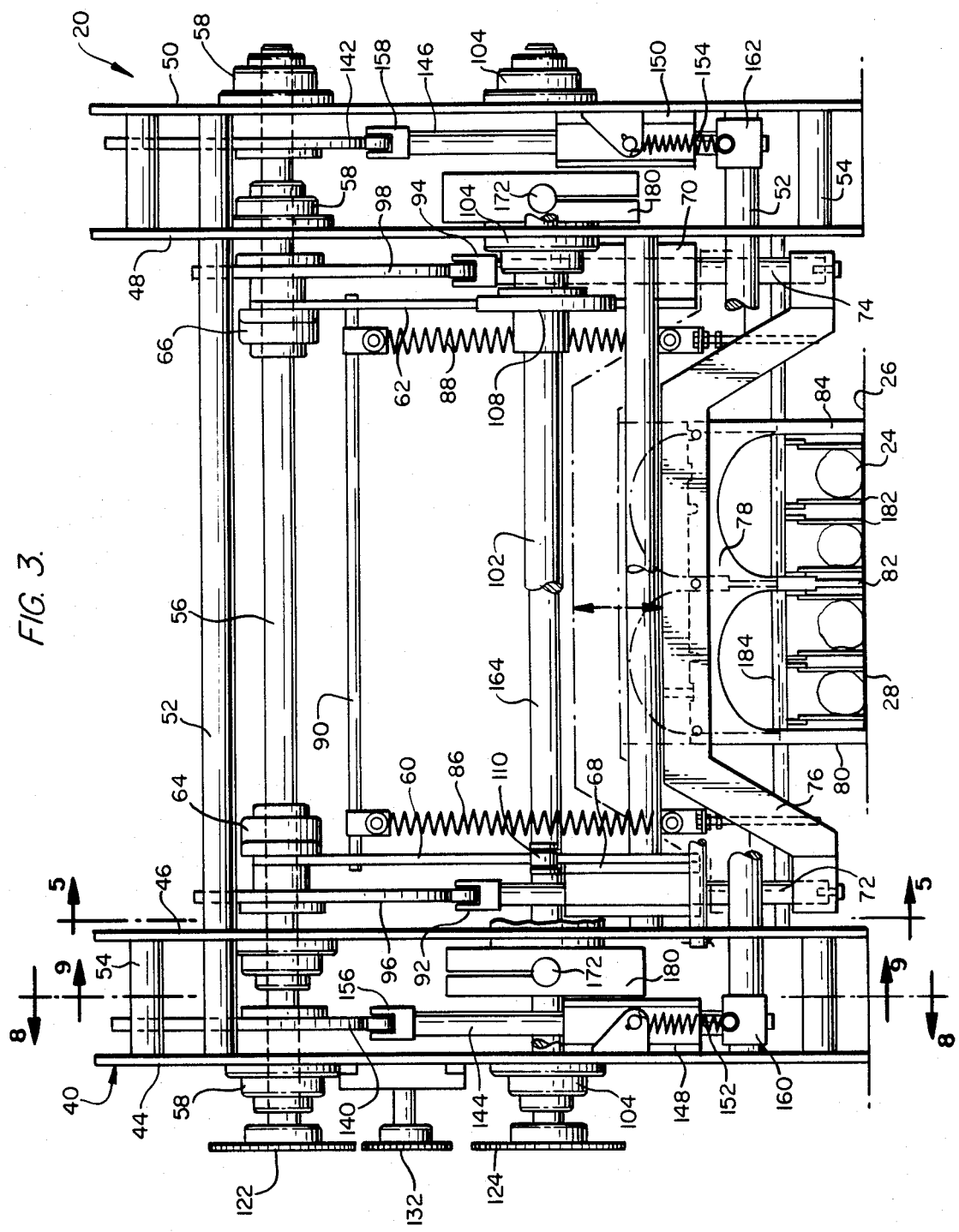
FIG. 3 is a detailed front elevation view of the apparatus of FIGS. 1 and 2.

The cutting apparatus 20 includes a frame 40 suitably mounted on a support 42 for extending over an exit end of the conveyor 26. As shown in FIG. 3, the frame 40 includes vertical plates 44, 46, 48 and 50 suitably secured together by long cross members 52 and short cross members 54. A horizontal shaft 56 is rotatably mounted by bearings 58 on the frame plates. A pair of swing arms 60 and 62 are pivotably mounted at their upper ends on the shaft 56 by bearings 64 and 66. Linear bearings 68 and 70 mounted on lower portions of the swing arms 60 and 62 slidingly support vertical push rods 72 and 74 which have their lower ends secured to ends of a carriage 76 having a centrally mounted bow-like fixture 78 with downward extending fingers 80, 82 and 84 on which the wire cutting element 28 is supported in taut condition. Tension springs 86 and 88 are fastened at their bottom ends to the carriage 76 and at their upper ends to a rod 90 extending horizontally between the swing arms 60 and 62 for biasing the carriage 76 and push rods 72 and 74 upward. Cam followers 92 and 94 mounted on upper ends of the push rods 72 and 74 engage cams 96 and 98 secured on the shaft 56 for vertically reciprocating the push rods 72 and 74 together with the carriage 76, bow member 78 and cutting element 28 as shown by the short and long dashed lines.

A horizontal shaft 102 is rotatably mounted by bearings 104 on the frame 40 and has a pair of cams 106 (FIG. 3) and 108 mounted thereon and engaging respective horizontally extending cam followers 110 and 112 mounted on the swinging arm 60 and 62. Tension springs 114 and 116 have one ends attached to bottom ends of the swing arms 60 and 62 and have opposite ends attached to a rod 118, see FIG. 5, extending across the frame, the springs 114 and 116 biasing the arm 60 and 62 forward to engage the cam followers 110 and 112 with the cams 106 and 108 so that the arms 60 and 62, push rods 72 and 74 and the carriage 76 supporting the cutting edge fixture 78 pivot about the shaft 56 in response to the contour of the cam 106 as illustrated by the arrow 120, FIG. 2.

For driving the shafts 56 and 101 in synchronism, gear sprockets 122 and 124 are mounted on ends of the shafts 56 and 102 and are driven by a chain 126, FIG. 4, which in turn is driven by a motor 128, reduction gear assembly 130, and sprocket 132. The speed of the cutting apparatus is selected in conjunction with the speed of the conveyor 26 to produce dough slices of a desired thickness and weight.

Figure 9:
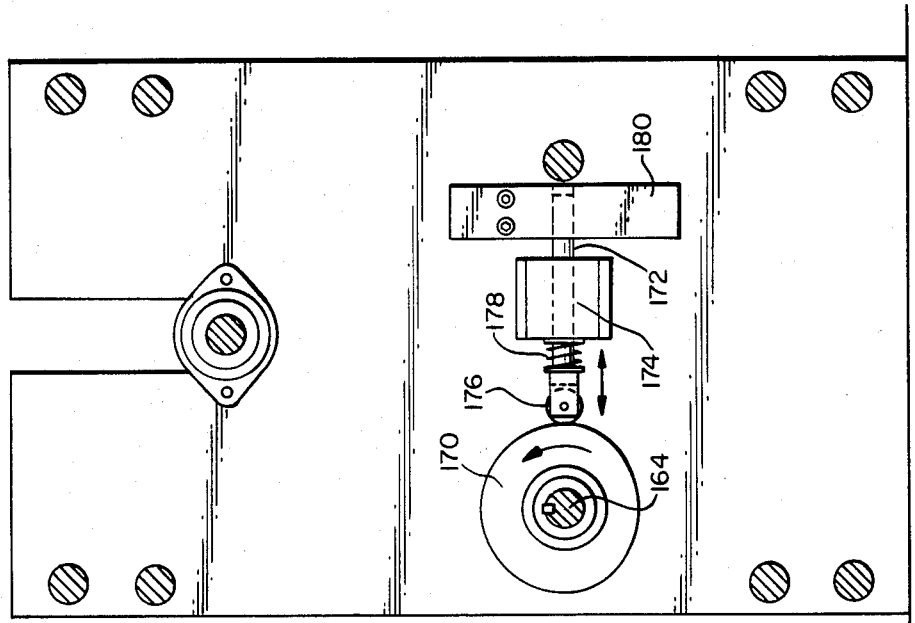
FIG. 9 is a cross-sectional side elevation view taken at line 9—9 in FIG. 3.
Figure 8:
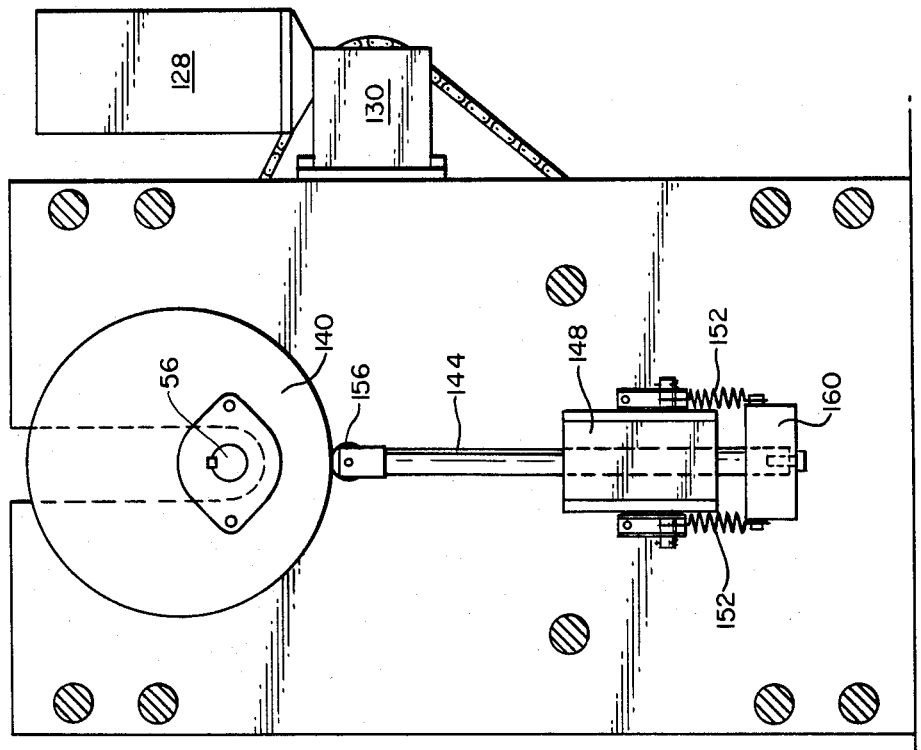
FIG. 8 is a cross-sectional side elevation view taken at line 8—8 in FIG. 3.

In order to enable relatively high speed operation of the cutter, the cutting apparatus includes counter balancing. Cams 140 and 142, substantially identical to the corresponding cams 96 and 98 are mounted on the shaft 56 but 180° opposite to the cams 96 and 98 for counterbalancing their rotational eccentricity. Vertical push rods 144 and 146 are slidably mounted within linear bearings 148 and 150 mounted on the plates 44 and 50 and are biased upward by tension springs 152 and 154. Cam followers 156 and 158 on upper ends of the push rods 144 and 146 engage the cams 140 and 142 so that the push rods 144 and 146 counterbalance the push rods 72 and 74. Weights 160 and 162 on the bottom ends of the rods 144 counterbalance the up and down movement of the carriage 76 and the fixture 78. A horizontal balance shaft 164, FIGS. 3 and 4, is rotatably mounted on the frame 40 by bearings 166 and is driven by a sprocket wheel 168 meshing with the chain 126. Counterbalance cams, only a one cam 170 shown in FIG. 9, are fixed on the shaft 164 for opposing the unbalance contributed by the cams 106 and 108. Horizontal push rods 172 slidably mounted in linear bearings 174 on the frame have cam followers 176 biased by springs 178 against the cams 170 and carry weights 180 on their opposite ends for counterbalancing the swing motion of the arms 60, 62, linear bearing 68 and 70, push rod 72 and 74, carriage 76 and fixture 78.

Additionally guides 182 are mounted by rod 184 on the frame 40 for guiding the dough logs 24 on the conveyor belt 26 as the dough logs enter the cutting area.

For aiding in the discharge of the slices from the cutting apparatus, air jets 186, FIGS. 10-14, are suitably mounted on the frame for directing an air stream at the slice 22 being cut so as to blow or assist the slice 22 from the end of the log 24 and off the end of the conveyor 26 and onto a conveyor 190. The cutting element 28 is positioned near the end of the conveyor 26, preferably as close as possible to the conveyor 190 without causing excessive distortion of the dough log, for engaging the upper surface of the conveyor 26 and cooperating therewith to sever the slices 22. Generally the cutting element 28 is positioned within or slightly past a vertical plane running through the horizontal axis of downward curvature at the forward end of the conveyor 26 so that the cutting element cooperates with the conveyor end portion where downward curvature begins or is insufficient to cause excessive distortion of the dough log. The conveyor 190 has a nose end extending in close proximity to the exit end of the conveyor 26 slightly below the upper surface of the conveyor 26 for receiving the falling slices 22. The conveyor 190 is driven at a rate substantially greater than the conveyor 26 so as to suitably space the slices 22 thereon.

Figure 2:
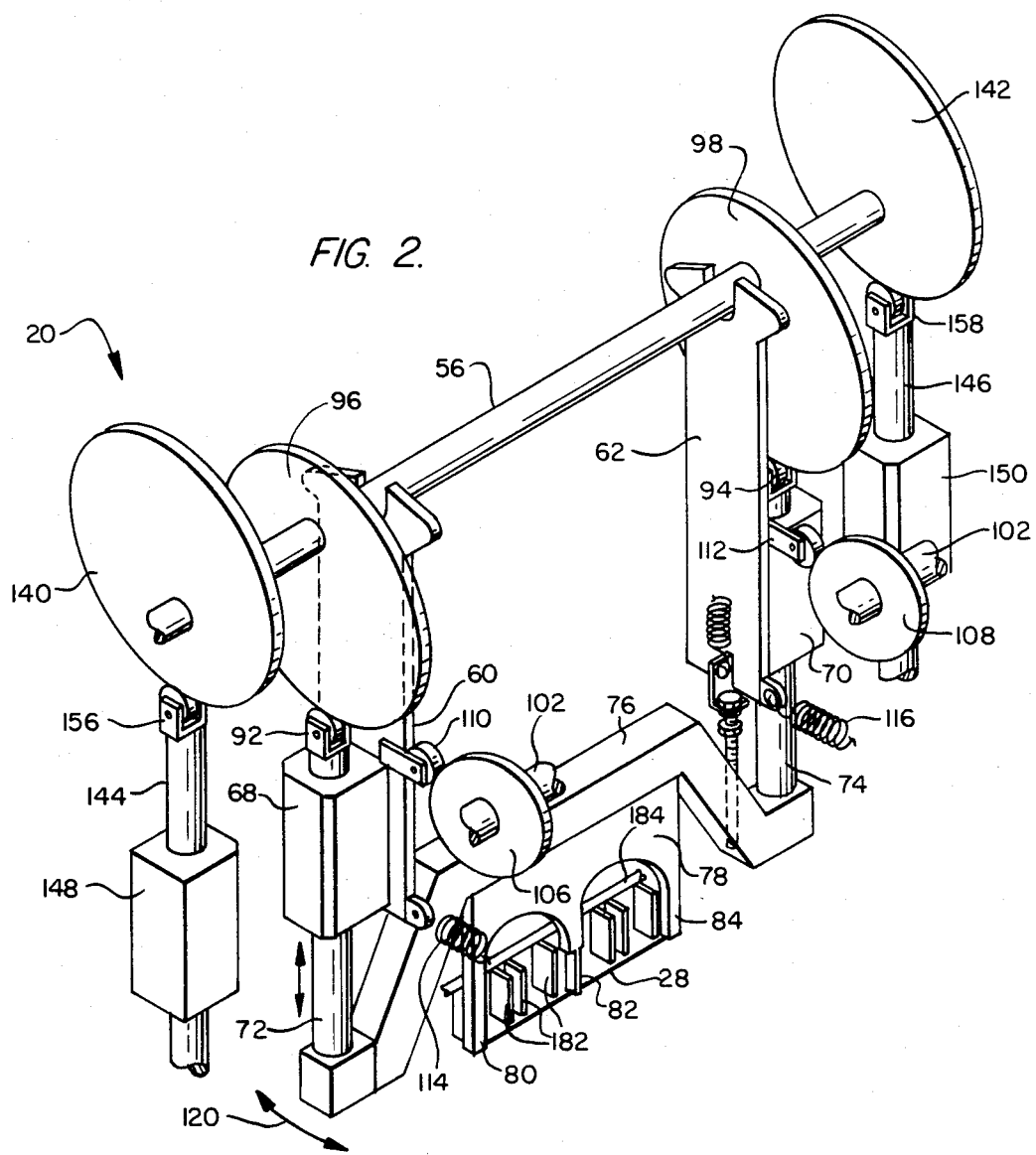
FIG. 2 is a perspective view of the operating mechanism removed from the cutting apparatus of FIG. 1.

In operation of the cutting apparatus 20 of FIGS. 1, 2 and 3, the round logs of soft cookie dough 24 having a diameter of, for example, 1 to 5 inches are advanced by the conveyor 26, the logs 27 laying on the flat upper surface thereof.

Figure 6:
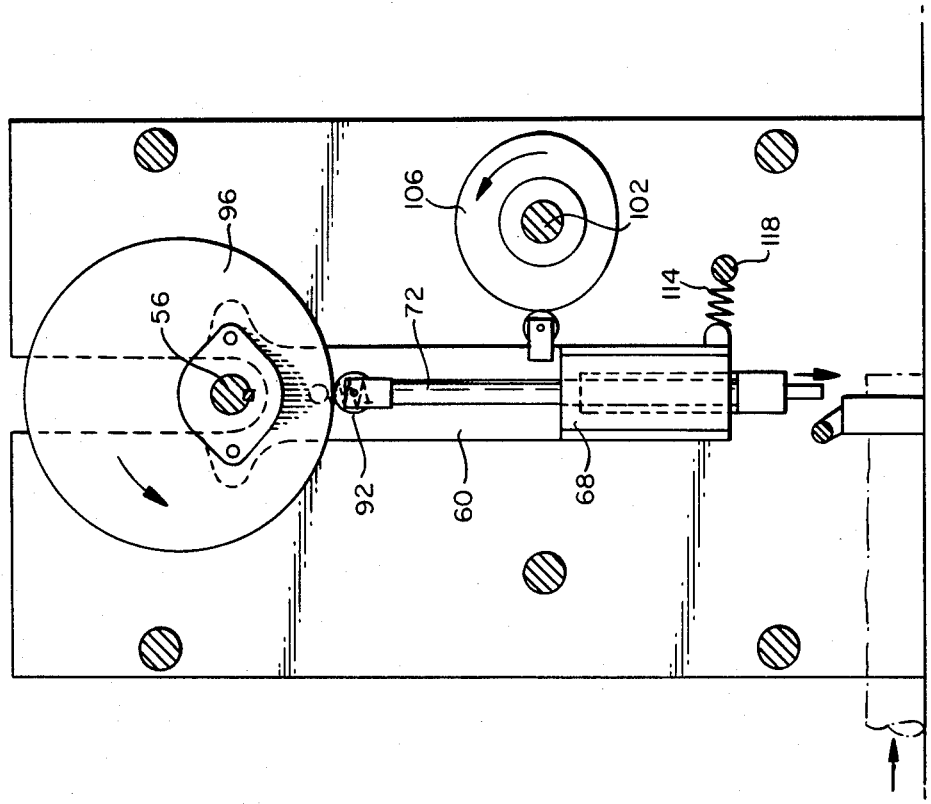
FIG. 6 is a view similar to FIG. 5 but illustrating a second operational position of the apparatus.
Figure 7:
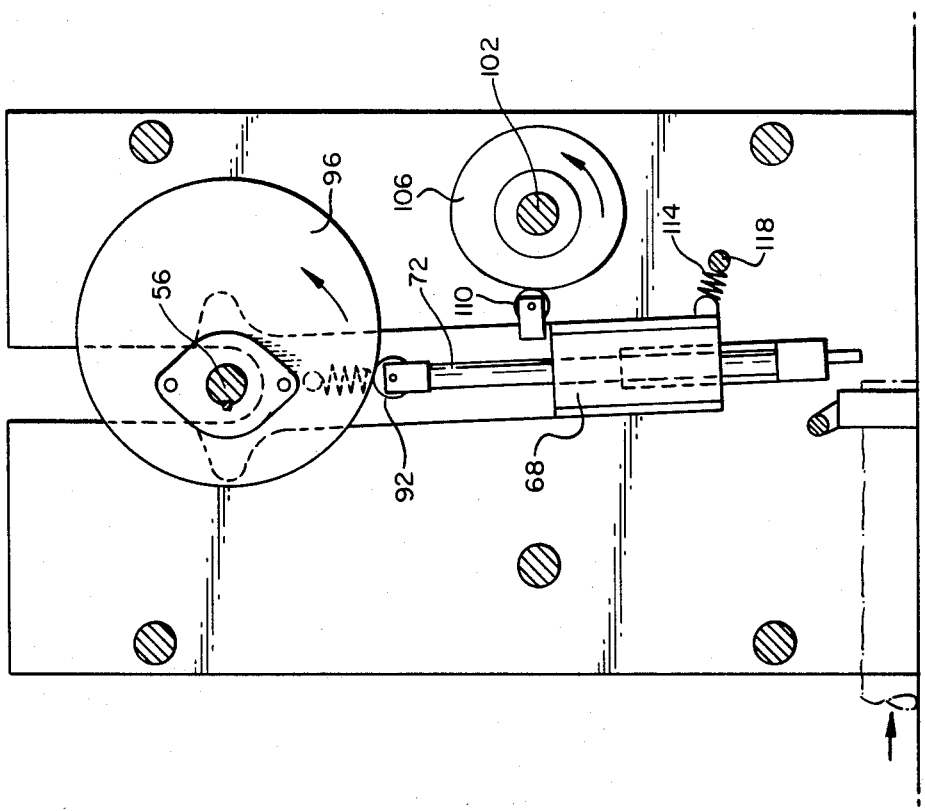
FIG. 7 is a view similar to FIGS. 5 and 6 but illustrating still another operational position of the apparatus.
Figure 15:
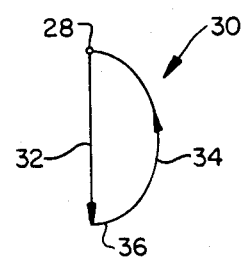
FIG. 15 is a diagram of the cutting motion of the cutting element of the apparatus of FIGS. 1 and 2.

The wire cutting element 28 is moved in a substantially D-shaped path as shown in FIG. 15 by the operation of the cams 96, 98, 106 and 108 as shown in FIGS. 5-6. During downward motion 32 as caused by the cam 96, the slice 22 is severed from the end of the dough log 24 as shown in FIG. 11. The cutting element 28 is then moved horizontally forward out of engagement with the end of the cookie log 24 by a horizontally directed motion 36 and then upward in return motion 34 spaced from the end of the log 24 to avoid engagement of the element 28 with the log 24 and distortion of the log. The motion 34 also returns the cutter 28 at its top motion to the downward path 32.

This use of a wire cutting element together with the D-shaped motion using a substantially straight cutting stroke coupled with a return motion designed to horizontally move the cutting element out of engagement with the advancing log enables substantially increased speed in cutting operation without distortion of the soft cookie dough.

The slices 22 as they are cut are blown or assisted by the streams of air from the jets 186 away from the ends of the dough logs and off of the end of the conveyor 26 whereupon they fall upon the conveyor 190. The blowing of the slices 22 from the end of the dough log and conveyor avoids substantial contact of the slices 22 with the wire cutting element 28 as it moves in its curvilinear return path 34 to avoid distorting of the slices 22. Thus the cutting mechanism produces substantially uniform slices having the same configuration as the cross-section of the log 24 without substantial distortion.

It is noted that the described embodiment preferably utilizes a curvilinear return path for the wire cutting element 28. However noncurvilinear return paths which suitably remove the cutting element and maintain the cutting element spaced from engagement with the end of the dough log 24 during the return movement could be used. The employment of cam mechanisms for providing the motion of the cutting element enables cutting motion.

Many modifications, variations and changes in detail may be made to the above-described embodiment without departing from the scope and spirit of the invention. Thus it is intended that the present invention is not to be limited to the above-specifically described embodiment.

What is claimed is:

1. An apparatus for cutting a log of relatively soft pliable material being continuously advanced forward longitudinally by a conveyor having a surface supporting the log, the apparatus comprising a wire cutting element, a movable holder tautly mounting the wire cutting element over and parallel to the conveyor surface and transverse to the advancing log, frame means extending over an exit end of the conveyor, a first horizontal shaft rotatably mounted in the frame and extending over the conveyor, a pair of swing arms pivotably mounted on the first shaft and extending downward therefrom, a pair of vertically extending push rods slidably mounted on the respective swing arms and including means supporting the movable holder on the bottom ends thereof, a pair of first cams mounted on the first shaft, a pair of first cam followers on the upper ends of the push rods for engaging the cams, spring means biasing the holder and push rods upward to hold the first cam follower means in engagement with the first cams, a second horizontal shaft rotatably mounted in the frame over the conveyor and extending adjacent to one sides of the swing arms, a pair of second cams mounted on the second shaft, a pair of second cam followers mounted on the swing arms for engaging the respective second cams, spring means for biasing the swing arms toward the second shaft to engage the second cam followers with the second cams, said first and second pairs of cams being designed for moving the holder and wire cutting element in a generally D-shaped path of movement including a substantially straight vertically downward portion of movement to engage the wire cutting element with the conveyor surface to sever a slice from the log and a return portion of movement beginning in a substantially forward horizontal movement at the end of the downward movement and ending in a rearward movement to return to the path of downward movement, drive means for rotating the first and second shafts in synchronism, said drive means and said first and second pairs of cams being selected in conjunction with the speed of the conveyor so that the wire cutting element is disengaged and remains disengaged from the advancing newly formed edge of the log during the return movement, and means for assisting in discharge of the slice from the end of the log.

2. An apparatus as claimed in claim 1 including counterbalancing weights mounted on the first and second shafts for counterbalancing the first and second cams.

3. An apparatus as claimed in claim 2 wherein the counterbalancing weights include third and fourth cam means substantially similar to the first and second cams but mounted on the respective shafts in opposition to the corresponding first and second cams, vertically extending second push rod means including cam follower means and spring biasing means for engaging the second push rod means against the third cam means to counterbalance the pair of first push rods, and horizontally extending weighted rod means including cam follower means and spring means for engaging the fourth cam means to counterbalance the swinging movement of the swinging arms, the push rods and the holder.

4. An apparatus for cutting a log of relatively soft pliable material comprising:

a first conveyor having a flat surface for continuously advancing the log forward longitudinally, said first conveyor having its forward end curving downward around a horizontal axis, a wire cutting element, a movable holder tautly mounting the wire cutting element over and parallel to the first conveyor surface and transverse to the advancing log, means for moving the holder and wire cutting element in a generally D-shaped path of movement including a substantially straight vertically downward portion of movement to engage the wire cutting element with the first conveyor surface to sever a slice from the log and a return portion of movement beginning in a substantially forward horizontal movement at the end of the downward movement and ending in a rearward movement to return to the path of downward movement, said substantially straight vertically downward portion of movement being within or slightly in front of a vertical plane containing the horizontal axis of the forward end of the first conveyor, said moving means being selected in conjunction with the speed of the first conveyor so that the wire cutting element is disengaged and remains disengaged from the advancing newly formed edge of the log during the return movement, and a second conveyor having a nose end extending in close proximity to the forward end of the first conveyor and slightly below the first conveyor surface for receiving the slice from the end of the log.

5. An apparatus as claimed in claim 4 wherein the apparatus includes air jet means for directing a stream of air in a forward and downward direction at the slice being severed to assist the slice onto the second conveyor.

6. An apparatus as claimed in claim 4 wherein the holder moving means comprises swing arm means, push rod means slidably mounted on the swing arm means and supporting the movable holder, first cam means for reciprocally driving the push rod means, and second cam means for oscillating the swing arm means, said first and second cam means being designed to produce said generally D-shaped path of movement of the holder and wire cutting element.

7. An apparatus as claimed in claim 6 further comprising counterbalancing means for counteracting said swing arm means, said push rod means, and said first and second cam means.

8. An apparatus for cutting a log of relatively soft pliable material comprising:
a conveyor having a flat surface for continuously advancing the log forward longitudinally,
a wire cutting element,
a movable holder tautly mounting the wire cutting element over and parallel to the conveyor surface and transverse to the advancing log,
frame means extending over an exit end of the conveyor,
a first horizontal shaft rotatably mounted in the frame and extending over the conveyor,
a pair of swing arms pivotably mounted on the first shaft and extending downward therefrom,
a pair of vertically extending push rods slidably mounted on the respective swing arms and including means supporting the movable holder on the bottom ends thereof,
a pair of first cams mounted on the first shaft,
a pair of first cam followers on the upper ends of the push rods for engaging the cams,
spring means biasing the holder and push rods upward to hold the first cam follower means in engagement with the first cams,
a second horizontal shaft rotatably mounted in the frame over the conveyor and extending adjacent to one sides of the swing arms,
a pair of second cams mounted on the second shaft,
a pair of second cam followers mounted on the swing arms for engaging the respective second cams,
spring means for biasing the swing arms toward the second shaft to engage the second cam followers with the second cams,
said first and second pairs of cams being designed for moving the holder and wire cutting element in a generally D-shaped path of movement including a substantially straight vertically downward portion of movement to engage the wire cutting element with the conveyor surface to sever a slice from the log and a return portion of movement beginning in a substantially forward horizonal movement at the end of the downward movement and ending in a rearward movement to return to the path of downward movement,
drive means for rotating the first and second shafts in synchronism,
said drive means and said first and second pairs of cams being selected in conjunction with the speed of the conveyor so that the wire cutting element is disengaged and remains disengaged from the advancing newly formed edge of the log during the return movement,
means for assisting in discharge of the slice from the end of the log, and
said discharge assisting means including a second conveyor for receiving the slice.

9. An apparatus as claimed in claim 8 including
counterbalancing weights mounted on the first and second shafts for counterbalancing the first and second cams.

10. An apparatus as claimed in claim 9 wherein the counterbalancing weights include third and fourth cam means substantially similar to the first and second cams but mounted on the respective shafts in opposition to the corresponding first and second cams, vertically extending second push rod means including cam follower means and spring biasing means for engaging the second push rod means against the third cam means to counterbalance the pair of first push rods, and horizontally extending weighted rod means including cam follower means and spring means for engaging the fourth cam means to counterbalance the swinging movement of the swinging arms, the push rods and the holder.

* * * * *